United States Patent [19]

Yamada et al.

[11] 4,250,450
[45] Feb. 10, 1981

[54] DETECTION OF ENGINE SPEED IN RESPONSE TO IGNITION OPERATION

[75] Inventors: Koukiti Yamada; Katsuyuki Miyake, both of Kariya, Japan

[73] Assignee: Nippondenso Co., Ltd., Kariya, Japan

[21] Appl. No.: 907,052

[22] Filed: May 17, 1978

[30] Foreign Application Priority Data

May 24, 1977 [JP] Japan .................... 52-60285

[51] Int. Cl.³ .................... G01P 3/481; F02P 1/00
[52] U.S. Cl. .................... 324/169; 123/643
[58] Field of Search .................... 324/168, 169; 123/148 E

[56] References Cited

U.S. PATENT DOCUMENTS

| | | | |
|---|---|---|---|
| 3,363,615 | 1/1968 | Meyerle | 324/169 |
| 3,605,713 | 9/1971 | Le Masters et al. | 123/148 E |
| 3,924,595 | 12/1975 | Brungsberg | 123/148 E |

Primary Examiner—Gerard R. Strecker
Attorney, Agent, or Firm—Cushman, Darby & Cushman

[57] ABSTRACT

A system for detecting rotational frequency of engine which comprises a switching device including a switching transistor for switching on and off the flow of current to the ignition coil of an internal combustion engine and a current limiting circuit for limiting the flow of current to the switching transistor to a predetermined value, and a speed detecting circuit connected to the junction of the ignition coil and the switching transistor. The speed detecting circuit is designed so that it has a threshold value voltage which is higher than the collector voltage of the switching transistor produced on limitation of current flow and which varies in response to the power supply voltage, and a signal is generated when the voltage at the junction of the ignition coil and the switching transistor exceeds the threshold value voltage, thus generating an output signal in synchronism with the spark ignition timing irrespective of variation in the supply voltage and thereby accurately detecting the engine speed irrespective of variation in the supply voltage.

2 Claims, 6 Drawing Figures

DETECTION OF ENGINE SPEED IN RESPONSE TO IGNITION OPERATION

FIELD OF THE INVENTION

The present invention relates to a system for detecting rotational frequency of engine which detects the speed of an engine electrically from the intermittent output signal of the ignition system.

DETAILED DESCRIPTION

Figure 1:
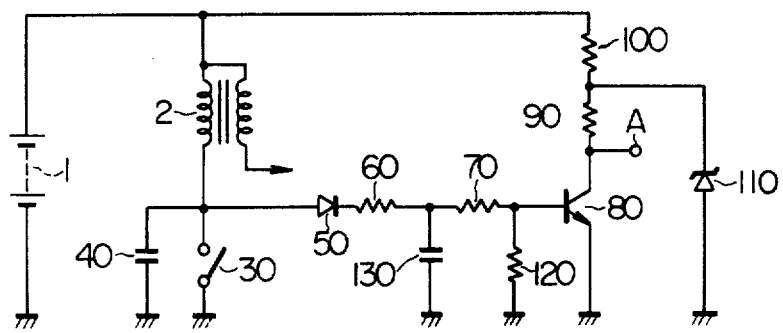
FIG. 1 is a circuit diagram showing an exemplary prior art system.
Figure 2:
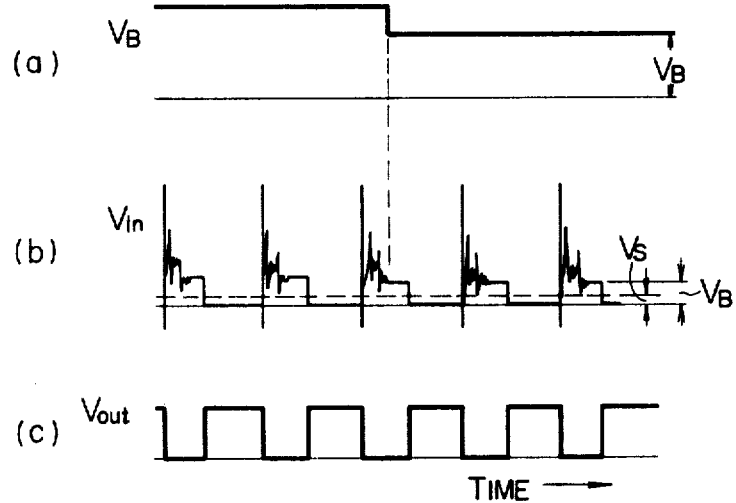
FIG. 2 is a signal waveform diagram useful for explaining the operation of the prior art system shown in FIG. 1.

In FIG. 1 which shows the circuit construction of a prior art system of the above type, the system is connected to the negative terminal of an ignition coil 2 of the ignition system or the junction point between the coil 2 and an interrupter 30 to receive intermittent signals from the interrupter 30, and the threshold value voltage $V_S$ of a speed detecting circuit section is determined by a diode 50, resistors 60, 70 and 120 and a transistor 80 so that when a signal voltage $V_{in}$ applied from the negative terminal of the ignition coil 2 is higher than the threshold voltage $V_S$, the transistor 80 is turned on, whereas the transistor 80 is turned off when the signal voltage $V_{in}$ is lower than the threshold voltage $V_S$, and an output signal $V_{out}$ of a waveform synchronized with the spark ignition as shown in (C) of FIG. 2 is generated from a terminal A to trigger a known type of monostable multivibrator which is not shown and whose output is in turn integrated and smoothed out to generate a voltage proportional to the number of revolution of engine.

Figure 3:
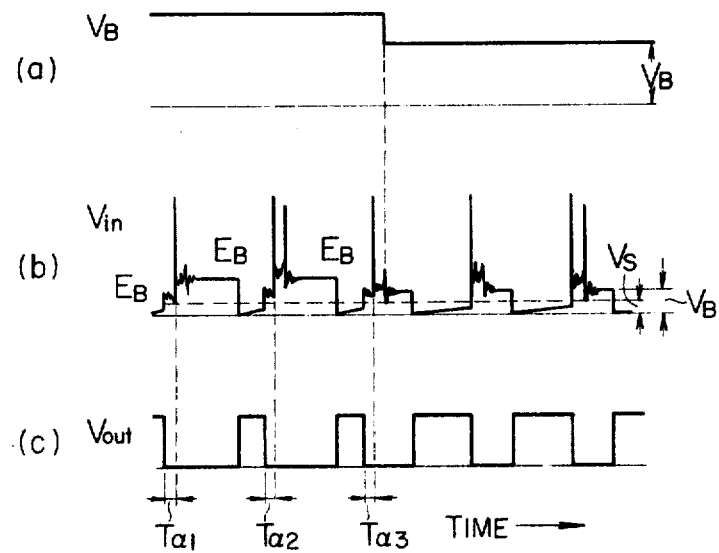
FIG. 3 is a signal waveform diagram for explaining the objects of the present invention.
Figure 4:
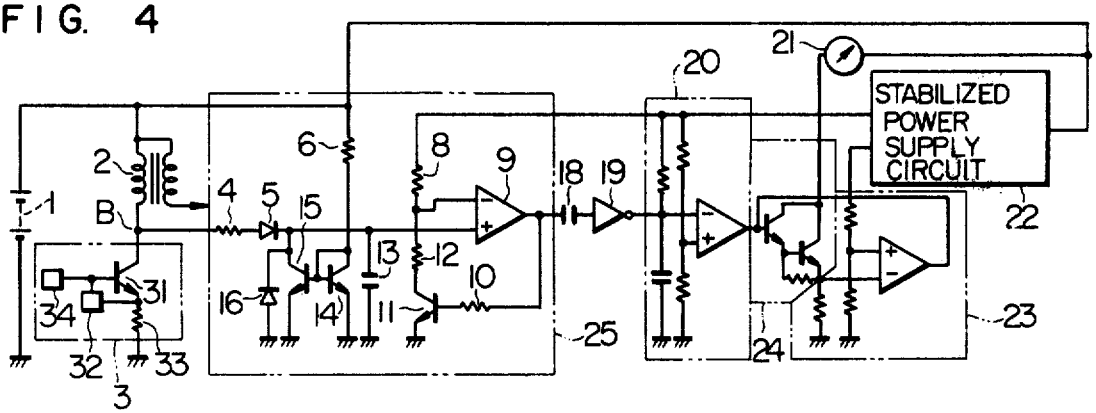
FIG. 4 is a circuit diagram showing an embodiment of an engine speed detecting system according to the invention.
Figure 5:
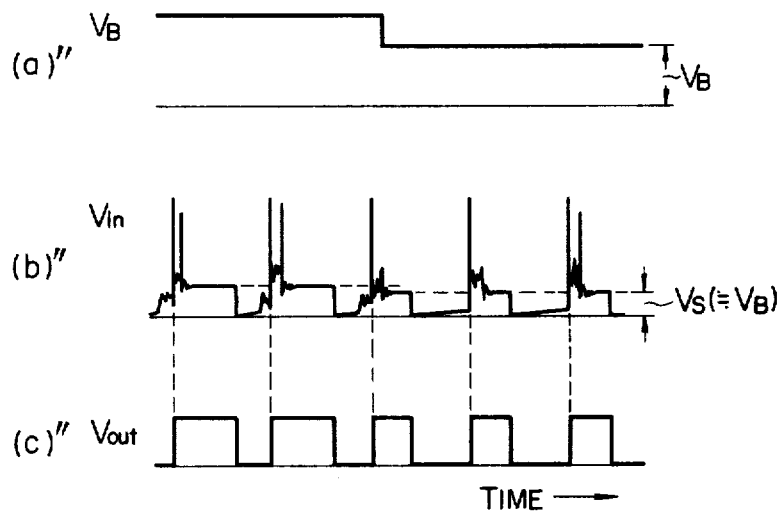
FIG. 5 is a signal waveform diagram useful for explaining the operation of the system shown in FIG. 4.

On the other hand, when a known mechanical contact type interrupter of the ignition system is replaced with an interrupter comprising, as shown at numeral 3 in FIG. 4, a contactless switching device including, as for example, shown in U.S. Pat. No. 3,605,713, a switching transistor as well as a current limiting circuit adapted to decrease the resistance of the series circuit including the ignition coil 2 and to thereby increase and limit to a predetermined value the current flowing to the switching transistor or the ignition coil so as to improve the ignition efficiency, the voltage $V_{in}$ appearing at the negative terminal of the ignition coil varies with variation in the power supply voltage $V_B$ as shown in (b) of FIG. 3. In other words, when the supply voltage $V_B$ is sufficiently high, a predetermined amount of current can be supplied to the ignition coil during the time interval from the time the transistor is turned on until the transistor is turned off, with the result that this current value is detected by the voltage across the reference resistor and the limiting circuit controls the amplification factor of the transistor. Consequently, after it is so made that the predetermined current flows in the coil, the collector voltage (unsaturated voltage) of the switching transistor which is shown at $E_B$ in (b) of FIG. 3 appears at the negative terminal of the coil. In this case, if the supply voltage becomes extremely low, it will be made impossible to supply the current of the predetermined value in a short period of time. When this occurs, the limiting circuit is not brought into operation so that the transistor remains conductive in the saturation region and the transistor collector voltage $E_B$ is not produced or produced only for a short period of time at the negative terminal of the coil as shown in (b) of FIG. 3.

As a result, if a detection circuit is used with the threshold value voltage $V_S$ is held constant irrespective of the power supply voltage $V_B$ and the signal voltage $V_{in}$ at the negative terminal of the coil, depending on whether the supply voltage $V_B$ is in the normal condition or at a very low level, the voltage $E_B$ is present or not present at the terminal B and the magnitude of this voltage $E_B$ varies with variation in the supply voltage $V_B$, thus failing to synchronize the resulting circuit output signal $V_{out}$ with the spark ignition moments and thereby causing deviations $T\alpha_1, T\alpha_2, \ldots$ therebetween as shown in (c) of FIG. 3. Thus, the problem with the output signal $V_{out}$ failing to synchronize with the spark ignition timing and thereby deviating therefrom is that at the instant such a deviation occurs, the engine speed indicating meter gives an indication as if there occurred a change in the number of revolution of engine.

With a view to overcoming the foregoing deficiencies, it is the object of the present invention to provide an improved engine speed detecting system comprising a switching device including a switching transistor and a speed detecting circuit connected to the junction of the switching transistor and an ignition coil and having threshold value voltage which is higher than the collector voltage of the switching transistor during current limiting period and which varies in response to variation in the power supply voltage, whereby a signal is generated when the voltage at the junction exceeds the threshold value voltage.

With this construction, the system of this invention has among its great advantages the fact that when detecting the engine speed from the ignition system including a switching device consisting of a switching transistor for switching on and off the flow of current to the engine ignition coil and a current limiting circuit for limiting the flow of current to the switching transistor to a predetermined value, it is possible to accurately detect the engine speed and generate an output irrespective of variations in the power supply voltage.

The system of this invention is featured in comprising a switching device including a switching transistor for switching on and off the flow of current to the ignition coil of an engine and a current limiting circuit for limiting the flow of current to the switching transistor to a predetermined value and a speed detecting circuit section connected to the junction between the switching transistor and the ignition coil and having a threshold value voltage which is higher than the collector voltage of the switching transistor produced during current limiting periods and which varies in response to variation in the power supply voltage whereby a signal is generated when the voltage at the junction point is higher than the threshold value voltage, and thus there is an advantage that an output signal completely synchronized with the spark ignition timing can be generated irrespective of variation in the power supply voltage to thereby accurately indicate the engine speed.

The present invention will now be described with reference to the embodiment shown in FIG. 4. In the Figure, numeral 1 designates a vehicle mounted power source, and 2 an ignition coil of an ignition system. Numeral 3 designates an ignition system switching device of the type shown, for example, in U.S. Pat. No. 3,605,713, and its principal component elements include a switching transistor 31, a current limiting circuit 32 responsive to the voltage appearing across a reference resistor 33 to control the amplification factor of the transistor 31 and thereby to limit the flow of current in the ignition coil 2 and a speed signal generating circuit 34 for generating speed signals synchronized with the rotation of the engine to turn on and off the switching transistor 31.

Numeral 25 designates a speed detecting circuit section in which the collector of a transistor 15 is connected to the negative terminal of the ignition coil 2 through a diode 5 and a resistor 4. The forward direction of the diode 5 means that direction of lesser resistance to the direction of current flowing from the negative terminal of the ignition coil 2 to the collector of the transistor 15. The emitter of the transistor 15 is grounded. The collector of a transistor 14 is connected to the positive side of the power source 1 through a resistor 6, and is also connected to the base of the transistor 14, thus, the collector of the transistor 14 is connected to the emitter thereof through a diode formed between the base and emitter of the transistor 14. The emitter of the transistor 14 is grounded, and a forward voltage is applied between the base and emitter of the transistor 14 to make it conductive. The base of the transistor 14 is connected to the base of the transistor 15, and the collector of the transistor 14 is connected to the base of the transistor 15 and is connected to the emitter thereof through a diode connection. Thus, a current Miller circuit is formed by means of the transistors 14 and 15. Consequently, the value of the current flowing to the collector of the transistor 14 is practically the same with that of the current flowing to the collector of the transistor 15. A diode 16 is connected between the collector and emitter of the transistor 15 so as to prevent the danger of the transistor 15 being damaged by a negative surging caused by the opening and closing of the switches for the electric load devices (e.g., alternator and blower motor for heater) which are not shown. A capacitor 13 is connected between the collector and emitter of the transistor 15 so as to smooth out the signal voltage including a high frequency component and produced at the negative terminal of the ignition coil 2. The inverting input of a comparator 9 is connected through a resistor 8 to the output of a stabilized power supply circuit 22. The collector of a transistor 11 is connected through a resistor 12 to the inverting input of the comparator 9. The base of the transistor 11 is connected through a resistor 10 to the output of the comparator 9. The emitter of the transistor 11 is grounded so as to allow the comparator 9 to exhibit a voltage hysteresis. In other words, assuming that $V_R$ represents the output voltage of the stabilizing power supply circuit 22, $R_8$ the resistance value of the resistor 8 and $R_{12}$ the resistance value of the resistor 12, when an input higher than $V_R$ is applied to the noninverting input of the comparator 9, the output of the comparator 9 goes to a high level, and the output of the comparator 9 changes to a low level when the input voltage drops below $V_R \times R_{12}/(R_8 + R_{12})$. As long as the value of the input voltage remains intermediate (greater than $V_R \times R_{12}/(R_8 + R_{12})$ but less than $V_R$), the output of the comparator 9 remains unchanged thus maintaining the output state produced prior to the application of the input voltage.

Assuming now that $V_B$ represents the power supply voltage, $V_S$ the threshold value voltage of the speed detecting circuit section 25, $R_4$ the resistance value of the resistor 4, $R_6$ the resistance value of the resistor 6, $V_F$ the forward voltage drop of the diode 5, $\beta$ the current amplification factor of the transistor 15, $I_1$ the input current to the comparator 9 and $V_C$ the comparison voltage of the comparator 9, the threshold value voltage $V_S$ of the speed detecting circuit section 25 is given by the following equation by virtue of the previously mentioned current Miller circuit $$V_S = \frac{R_4}{R_6}(1 - \frac{2}{\beta})(V_B - V_F) - I_1 R_4 + V_F + V_C \quad (1)$$

Since generally $2/\beta << 1$ and $I_1 \approx 0$, the above equation can be simplified as follows $$V_S = R_4/R_6 (V_B - V_F) + V_F + V_C \quad (2)$$

However, the value of $V_C$ in the equations (1) and (2) is such that $V_C = V_R$ when the output of the comparator 9 changes from the low level to the high level and $V_C = V_R \times R_{12}/(R_8 + R_{12})$ when the comparator output changes from the high level to the low level. As shown by the equation (2), the threshold value voltage $V_S$ of the speed detecting circuit section 25 varies in response to the power supply voltage $V_B$. With the previously mentioned ignition system, since it has been confirmed that normally the collector voltage of the transistor 31 produced during current limiting periods as shown at $E_B$ in (b) of FIG. 3 is slightly lower than the supply voltage $V_B$, by suitably selecting the resistors 4 and 6 to set the threshold value voltage $V_S$ of the speed detecting circuit section 25 to a value which is close to and slightly higher than the power supply voltage $V_B$, it is possible to always generate as the output signals of the comparator 9 signals which are synchronized with the spark ignition moments irrespective of variations in the power supply voltage.

Since the comparator 9 exhibits a voltage hysteresis by virtue of the resistor 10 and the transistor 11, even if a slight ripple is included in the input signal which has been smoothed out by the capacitor 13 through the resistor 4 and the diode 5, the comparator 9 remains entirely irrespective to this ripple voltage so as to generate a stable speed signal.

In the present embodiment, a differentiating capacitor 18 is connected to the output of the comparator 9 and the differentiating capacitor 18 is also connected to the input of an amplifier 19, with the result that the output of the comparator 9 causes the capacitor 18 to generate a differentiated pulse and the amplifier 19 amplifies only the differentiated pulse of the positive-going edge of the output waveform of the comparator 9 so as to trigger a monostable multivibrator 20 consisting of a differential amplifier. The output of the monostable multivibrator 20 is amplified to a pulse of a predetermined current value through a constant current drive circuit 23 and a current amplifier circuit 24 and the pulse actuates an indicating ammeter 21 having a scale calibrated in revolutions per minutes to indicate the engine speed.

With the embodiment described above, the elements except the smoothing capacitor 13, the differentiating capacitor 18 and the time constant determining resistor and capacitor in the monostable multivibrator 20 can be easily produced by the integrated circuit techniques.

Figure 6:
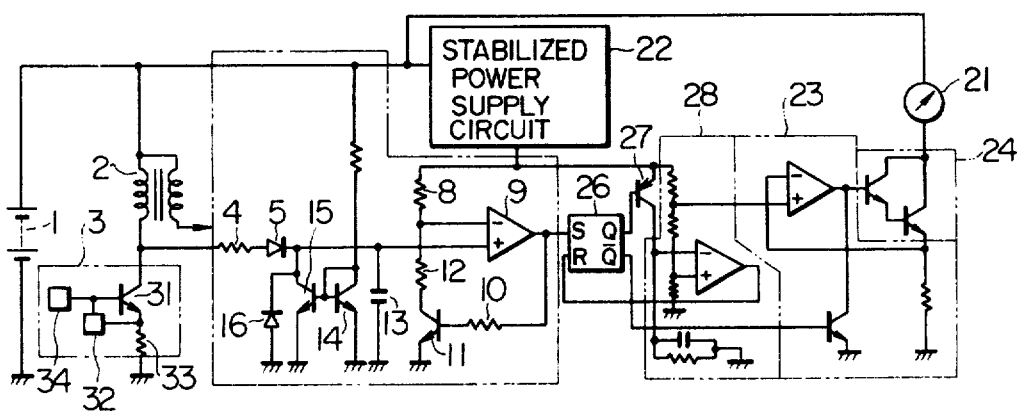
FIG. 6 is a circuit diagram showing another embodiment of the system according to the invention.

FIG. 6 illustrates another embodiment of the invention which is the same with the previously described embodiment except that the circuits connected to the speed detecting circuit section 25 differ somewhat in construction. In the Figure, numeral 26 designates a flip-flop circuit connected to the speed detecting circuit section 25 and so constructed that when a synchronizing signal synchronized with the spark ignition timing is applied from the speed detecting circuit section 25, the flip-flop circuit 26 is set to turn off a transistor 27 and trigger a monostable multivibrator 28, and also the flip-flop circuit 26 serves as a hold circuit during the time that the monostable multivibrator is in operation so as to cut off the input signal, thus applying a pulse current of a predetermined pulse width and a predetermined current value to the indicating meter 21 through the constant current drive circuit 23 and the current amplifier circuit 24 and thereby causing the indicating meter 21 to accurately indicate the engine speed.

What is claimed is:

1. A system for detecting engine speed comprising:
   a power source for supplying voltage to said system;
   an engine ignition coil joined at one of its ends to said power source;
   switching means connected between the opposite end of said coil and ground, said switching means including a switching transistor operable between on and off conditions to control the flow of current from said power source through the ignition coil and the switching transistor to ground, said switching means further including: a speed signal generating circuit joined to the switching transistor and responsive to the speed of said engine for switching said transistor on and off at a rate dependent on engine speed, and a current limiting circuit for limiting the flow of current through said switching transistor to a predetermined value;
   circuit means connected to said power source and to a junction point at which said ignition coil and said switching means are joined, said circuit means including voltage control means for producing a threshold value voltage which is variable in response to variations of the voltage of said power source, said circuit means generating pulses when the voltage at said junction exceeds the threshold value voltage as the transistor is switched on and off, said pulses thereby being synchronized with the engine speed; and
   means connected to said circuit means and responsive to said pulses for indicating the engine speed.

2. A system as set forth in claim 1, wherein said circuit means comprises a comparator having a pair of inputs, a Miller current circuit connected to said power source, to said junction point of said ignition coil and said switching transistor, and to one input of said comparator, a stabilized power supply, a voltage divider circuit connected at one of its ends to said stabilized power supply, and a further transistor connected in series with the other end of said voltage divider circuit and also electrically connected to an output of said comparator whereby said further transistor is turned on and off in response to an output voltage of said comparator, said voltage divider circuit intermediate its ends having an output connected to the other input of said comparator.

* * * * *